United States Patent
Chawgo (10) Patent No.: US 11,133,668 B2
(45) Date of Patent: *Sep. 28, 2021

(54) REDUNDANT OVER-VOLTAGE PROTECTION/POWER DISTRIBUTION SYSTEM FOR TELECOMMUNICATION SYSTEMS

(71) Applicant: John Mezzalingua Associates, LLC, Liverpool, NY (US)

(72) Inventor: Shawn M. Chawgo, Phoenix, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/410,596

(22) Filed: May 13, 2019

(65) Prior Publication Data

US 2019/0267800 A1 Aug. 29, 2019

Related U.S. Application Data

(63) Continuation of application No. 15/141,081, filed on Apr. 28, 2016, now Pat. No. 10,291,019.

(60) Provisional application No. 62/158,144, filed on May 7, 2015.

(51) Int. Cl.
*H02H 9/04* (2006.01)
*H02H 3/05* (2006.01)

(52) U.S. Cl.
CPC .............. *H02H 9/041* (2013.01); *H02H 3/05* (2013.01)

(58) Field of Classification Search
CPC ................................ H02H 9/041; H02H 3/05
See application file for complete search history.

(56) References Cited

U.S. PATENT DOCUMENTS

| | | | |
|---|---|---|---|
| 7,075,767 B2 * | 7/2006 | Gemme | H01H 9/106 337/284 |
| 8,068,937 B2 | 11/2011 | Eaves | |
| 8,781,637 B2 | 7/2014 | Eaves | |
| 2003/0156798 A1 * | 8/2003 | Cull | G02B 6/3817 385/71 |
| 2008/0088405 A1 * | 4/2008 | Xu | H01C 7/12 338/21 |
| 2012/0200978 A1 * | 8/2012 | Miller | H01T 4/04 361/118 |

(Continued)

OTHER PUBLICATIONS

Stephen S. Eaves; VoltServer, Inc.; Remote Power Feeding for Compact Base Stations; 2012 INTELEC Conference; Sep. 30, 2012; Scottsdale, Arizona; 26 pages.

(Continued)

*Primary Examiner* — Scott Bauer
(74) *Attorney, Agent, or Firm* — Barclay Damon LLP (57) ABSTRACT

A redundant over-voltage protection/power distribution system for a macro/distributed antenna telecommunications system. The overvoltage protection system includes first and second surge protection devices each having one end electrically connected to the power cable upstream of an RRU and a second end electrically connected to ground. The first and second surge protection devices issuing an alert signal when one of the devices is in a failed condition and changing state to provide the RRUs with uninterrupted power for continuous operation of the telecommunications system when one of the surge protection devices has failed.

12 Claims, 7 Drawing Sheets

(56) References Cited

U.S. PATENT DOCUMENTS

2014/0168842 A1\* 6/2014 Martinez ................. H02H 9/04
                                                            361/91.1
2015/0162743 A1\* 6/2015 Kashyap ............. H01L 27/0248
                                                            361/91.5

OTHER PUBLICATIONS

Stephen S. Eaves; VoltServer, Inc.; Network Remote Power using Packet Energy Transfer; Sep. 30, 2012; published online Dec. 6, 2012 by IEEE Xplore; <http://ieeexplore.ieee.org/document/6374488/>; 4 pages.

U.S. Appl. No. 15/086,674, filed Mar. 31, 2016; inventors: Shawn M. Chawgo and Todd Landry.

U.S. Appl. No. 15/086,706, filed Mar. 31, 2016; inventors: Shawn M. Chawgo and Todd Landry.

\* cited by examiner

REDUNDANT OVER-VOLTAGE PROTECTION/POWER DISTRIBUTION SYSTEM FOR TELECOMMUNICATION SYSTEMS

CROSS-REFERENCE TO RELATED APPLICATIONS

This application is a non-provisional patent application of, and claims the benefit and priority of, U.S. Non-Provisional Utility patent application Ser. No. 15/141,081 filed on Apr. 28, 2016 and due to issue as U.S. Pat. No. 10,291,019 on May 14, 2019, which claims priority to U.S. Provisional Application No. 62/158,144 filed on May 7, 2015. The entire contents of such applications are hereby incorporated by reference.

BACKGROUND

Telecommunication systems employ a variety of cellular systems and devices to wirelessly transmit/receive voice and data signals over large geographic areas and in small confined spaces. Outdoor macro telecommunications sites typically employ, inter alia, a plurality of telecommunications antennas, e.g., sector antennas, mounted atop elevated towers/scaffolding/buildings, for the purpose of transmitting/receiving RF signals, i.e., providing cellular coverage, over a large geographic area. Such land-based antennas may communicate with and employ orbital telecommunications satellites, Distributed Antenna Systems (DAS), or other land-based telecommunications systems.

Localized telecommunications, or DAS, augment radio frequency (RF) communications, i.e., cellular coverage, provided by external/global satellite or land-based antenna systems. More specifically, a DAS provides coverage in spaces, buildings, tunnels, etc., which would otherwise block, attenuate, absorb or interfere with the RF signals/energy transmitted/received by the external/global systems. Such spaces include high-rise buildings, hotels, stadiums, universities, casinos, etc., where RF coverage is essential for uninterrupted and reliable telecom service. The objective of a Distributed Antenna System (DAS) is to provide uniform RF coverage within a defined space to optimally or selectively distribute RF energy within that space.

Land-based antennas, or Macro Antenna Systems (MAS), typically include: (i) a Base Transceiver Station (BTS) providing RF signals from local service providers, e.g., Verizon, Comcast, AT&T, etc., through a Base-Band Unit (BBU), (ii) a Remote Radio Unit (RRU) communicating RF data with the BBU and operative to augment, amplify, attenuate, and transmit RF signals received from the BBU, (iii) a plurality of telecommunication antennas each connecting to an RU, and a (iv) a tower/scaffolding/elevating structure for mounting the RRU and telecommunication antennas. The BBU is disposed in the equipment room/Base Transceiver Station (BTS) shelter and connected to the RRU via a combination of optical fiber and copper wire.

Similarly, a Distributed Antenna Systems, or DAS typically includes, at one end: (i) a plurality of Base Transfer/Transceiver Stations (BTS) providing the RF signals of each service provider, e.g., Verizon, Comcast, AT&T etc., (ii) a DAS head-end for receiving, handling, and manipulating the various RF signals of the Base Transfer/Transceiver Stations, (iii) a plurality of Remote Units (RUs) amplifying/attenuating signals received from the DAS head-end, and (iv) a telecommunications antenna connecting to each of the remote units at the other end of the DAS. Similar to a MAS, the DAS head-end connects to each of the remote units by a plurality of conductive and fiber optic cables.

A DAS may comprise a variety of system types including passive, active and hybrid systems. Passive systems employ conventional coaxial cables to distribute telecommunication signals within an internal space, active systems typically employ optic fiber cable to distribute RF signals, while hybrid systems employ a combination of the passive and active systems. passive system is generally less complex and costly to implement inasmuch as the coaxial cable employed therein is inherently capable of handling multiple carrier frequencies issued by RF service providers. On the other hand, the strength of the radio signal issued by passive system rapidly diminishes the farther the cable is from the signal source. Consequently, passive systems are not well-suited for large facilities having long/complicated cable runs, and cannot provide end-to-end cable monitoring. Active DAS, on the other hand, delivers strong and consistent signals at every node, irrespective the distance from the signal source. Furthermore, active DAS is capable of monitoring nearly all system components, e.g. the remote units, antennas, base band units, using a conventional Simple Network Management Protocol (SNMP). Finally, and perhaps most importantly, fiber optic cable used in active DAS can be run over large distances without losing signal strength. Further, fiber optic cable employed in active systems can be less expensive to install inasmuch as the cabling is lighter and easier to deploy across ceilings and in tight spaces.

DAS and MAS telecommunication systems are often protected from electrical surges, such as from lightning strikes, by Metal Oxide Varistors (MOVs) which direct potentially hazardous/damaging current away from sensitive components. More specifically, the resistance of such MOVs varies with voltage such that at low voltage the resistance blocks current flow thought the MOV and at high voltage the resistance enables current flow. In use, MOVs are typically connected, at one end, to an electrical circuit upstream of the components sought to be protected. At the other end, the MOV connects to ground, or to a structure connected to ground. During normal operation, the electrical circuit operates at a first low potential wherein the resistance of the MOV is sufficiently high to direct electrical energy into the circuit without interfering with current flow. That is, the circuit operates as if the MOV were not part of the circuit, i.e., not connected. In the event of an electrical surge or lightning strike, the increased voltage lowers the resistance across the MOV. The resistance is reduced to level to effectively connect the circuit to ground, i.e., shorting the circuit. Inasmuch as the current flow is directed to ground upstream of the components sought to be protected, the MOV prevents potentially damaging high current from adversely impacting the circuit. Once the power surge has passed, the ohmic or resistive properties of the MOV to return the circuit to its normal operation, i.e., directing current back into the operating circuit. That is, the resistance of the MOV increases to direct current to the circuit rather than to ground.

While MOVs provide a reliable source of overvoltage protection, the metal oxide materials, i.e., the zinc, cobalt, nickel e.g., used therein degrade over time and fail. That is, repeated current spikes cause the disc-shaped varistor used therein to become brittle and crack, resulting in an open circuit. This "end-of-life" or failed condition is often combated by implementing a meltable metal disc within a cavity of the MOV housing, i.e., the housing which contains the varistor disc. Upon experiencing an overvoltage condition, a high current condition causes the metal to melt, filling the gap in the varistor disc. In addition to providing the requisite overvoltage protection, the meltable metal completes another circuit issuing a signal that MOV has failed, i.e., permanently.

Detecting an end-of-life condition of an MOV is important for ensuring the efficacy of a viable surge protection system. Without end-of-life circuit monitoring, Remote Radio Units (RRUs), which are protected by such systems, can be vulnerable to a non-functioning/inoperable MOV. That is, without a periodic, and potentially premature, system of replacement, MOVs may have reached an end-of-life condition while RRUs are essentially unprotected from energy spikes/lightning strikes.

On the other hand, the use of such end-of-life circuit monitoring, typically results in RRUs being taken off-line immediately to protect expensive equipment from being damaged. Consequently, revenues associated with cellular service are lost from the time that the service is initially taken off-line to the time that it is restored. Minimally, a service call will be issued, a team of service-provider technicians deployed, an MOV removed/replaced, and a system test performed to ensure that a newly installed MOV is properly working/installed. It will be appreciated, therefore, that on the one hand, MOVs which employ meltable metal protectors become inoperable, and the RRUs vulnerable to subsequent lightning strikes. On the other hand, MOVs which simply fail, without providing a means for continued protection, take the RRUs off-line with the attendant lost revenues associated with disuse.

The foregoing background describes some, but not necessarily all, of the problems, disadvantages and challenges related to the reuse of cable connectors.

BRIEF DESCRIPTION OF THE DRAWINGS

Additional features and advantages of the present disclosure are described in, and will be apparent from, the following Brief Description of the Drawings and Detailed Description.

SUMMARY OF THE INVENTION

A redundant over-voltage protection/power distribution system is provided for a macro/distributed antenna telecommunications system. The overvoltage protection system includes first and second surge protection devices each having one end electrically connected to the power cable upstream of an RRU and a second end electrically connected to ground. The first and second surge protection devices issue an alert signal when one of the devices is in a failed condition and change state in response thereto so as to provide the RRUs with uninterrupted power for continuous operation of the telecommunications system. Specifically, a relay interposes an end of one of the surge protection devices and is responsive to an end-of-life alert signal from the failed surge protection device to change the state of the other surge protection device to: (i) provide continuous operation to the telecommunication system, and (ii) provide a cue that one of the surge protection devices has failed, i.e., such that the surge protection devices may be replaced and reset to protect against a subsequent lightning strike.

DETAILED DESCRIPTION

The following describes a Metal Oxide Varistor (MOV) surge suppression system in the context of a Macro Antenna telecommunication System (MAS). While the overvoltage protection system has a particularly unique and valuable application to such telecommunications systems, it will be appreciated that the MOV overvoltage protection system has widespread application to other telecommunications systems, e.g., Distributed Antenna telecommunications Systems (DAS), and to other power distributions systems, including low and high voltage power distribution and Digital Energy/Packet Energy Transfer (PET) power distribution systems.

Figure 1:
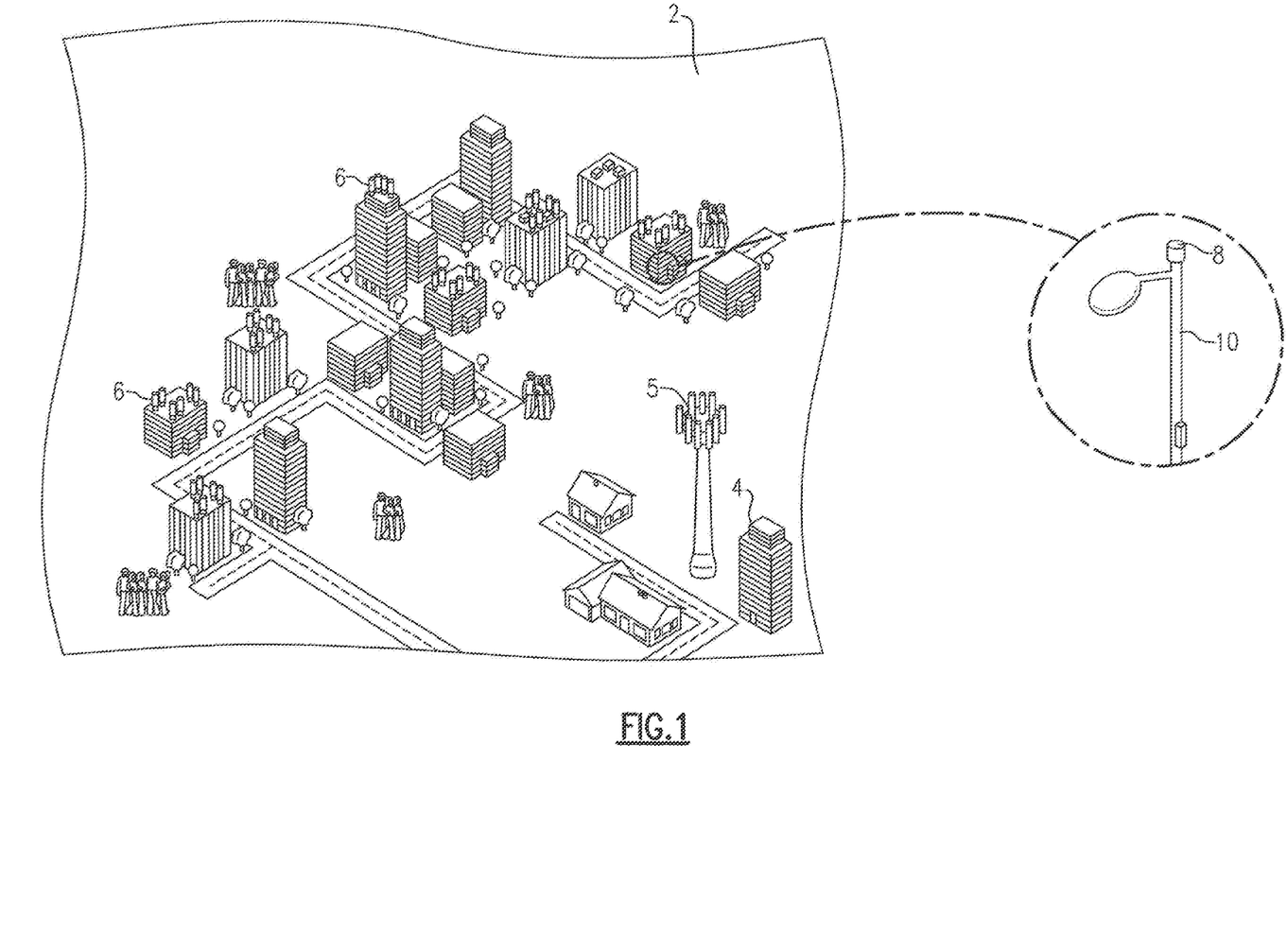
FIG. 1 is a schematic diagram illustrating an example of one embodiment of an outdoor wireless communication network.

In FIG. 1, a Macro Antenna telecommunication System (MAS) 2 includes a cell site or a cellular base transceiver station 4. The base transceiver station 4, in conjunction with the cellular tower antennas 5, serves communication devices such as mobile phones in a defined area surrounding the base transceiver station 4. The MAS antennas are disposed on the cellular tower 5 or may be mounted to buildings or other elevated structures such as, for example, street lamps.

Figure 2:
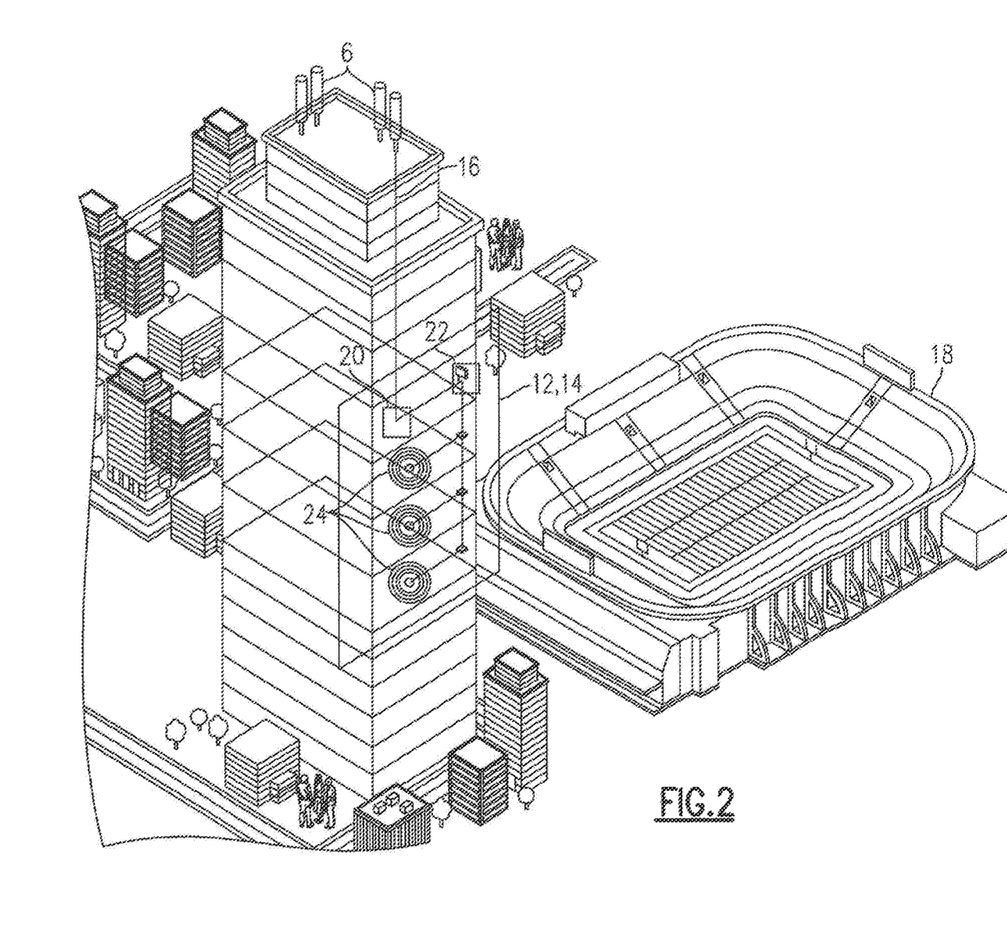
FIG. 2 is a schematic diagram illustrating an example of one embodiment of an indoor wireless communication network.

In FIG. 2, a Distributed Antenna telecommunication System 10 (DAS) includes a plurality of canister antennas 6 electrically coupled to a remote unit or Radio Frequency ("RF") repeater 20 (hereinafter "RF repeater"). The DAS 10 can, for example, be installed in a variety of buildings and/or enclosures which have structures or materials which interfere with the RF signal which would otherwise be obtained directly from a satellite or a land-based MAS 2. For example, a DAS 10 may be installed in a high-rise office building 16a, a sports stadium 16b, a shopping mall 16c or other similar enclosures 16. Inasmuch as it can be sometimes difficult to provide RF coverage to internal spaces within such enclosures 16, the DAS 10 provides a link for all telecommunications subscribers within the enclosure 16.

The RF repeater 20 amplifies and repeats the received signals, i.e., from the nearby MAS 2. The RF repeater 20 is coupled to a DAS head end or head-end unit 22 which, in turn, is coupled to a plurality of remote antenna units 24 distributed throughout the building 16. Depending upon the embodiment, the DAS head end 22 can manage a plurality of RUs, e.g., over one hundred remote antenna units 24, within a building.

Packet Energy Transfer (PET) Technology

While the foregoing MAS and DAS telecommunication systems 2, 10, may be powered by conventional direct/ alternating current (DC or AC) power sources, such telecommunications system may be powered by a novel Digital or Packet Energy Transfer (DE/PET) power distribution system. Digital/Packet Energy Transfer (DE/PET) is a power distribution system which separates electrical power into a series discrete time domains referred to as digital energy packets. Each packet has a first time domain/slot for energy transfer, and a second time domain/slot for providing digital/analog signature verification. Using this approach, much higher levels of power can be safely transmitted from a power source to a load, i.e., the downstream equipment. For example, three-hundred and forty-five volts (DC 345 V) can be safely delivered using DE/PET technology in contrast to just fifty-six volts (DC 56 V) when delivering analog power over conventional Category 5 or Category 6 coaxial cable.

The increased level of safety is achieved by the ability of a DE/PET system to distinguish between an individual making contact with power conductors and the current drawn by powered equipment. That is, since an individual effects the draw of current differently, the DE/PET system can rapidly shut down upon sensing the difference. The sensing circuit is sufficiently reliable that regulatory authorities now consider DE/PET technology to be on a par with Ground Fault Interrupt (GFI) circuits employed in analog circuits. Accordingly, DE/PET is deemed, by some, to be the new gold-standard in safety for electrical power systems. A Digital Energy/Packet Energy Transfer (DE/PET) system suitable for powering the telecommunications systems described herein is more fully described in: (i) Eaves U.S. Pat. No. 8,068,937 entitled "Power Distribution System with Fault Protection Using Energy Packet Confirmation," filed Feb. 4, 2009, (ii) Eaves U.S. Pat. No. 8,781,637 entitled "Safe Exposed Conductor Power Distribution System," filed Dec. 7, 2012,(iii) Chawgo U.S. patent application Ser. No. 15/085,574 entitled "Packet Energy Transfer Powered Telecommunications System for Distributed Antenna Systems and Integrated Wireless Fidelity System, and (iv) Chawgo U.S. patent application Ser. No. [[15/085] entitled "Packet Energy Transfer Powered Telecommunications System For Macro Antenna Systems And Power Distribution System Therefor" all of which are incorporated herein by reference in their entirety.

Redundant Power Distribution for Telecommunication Systems

Figure 3:
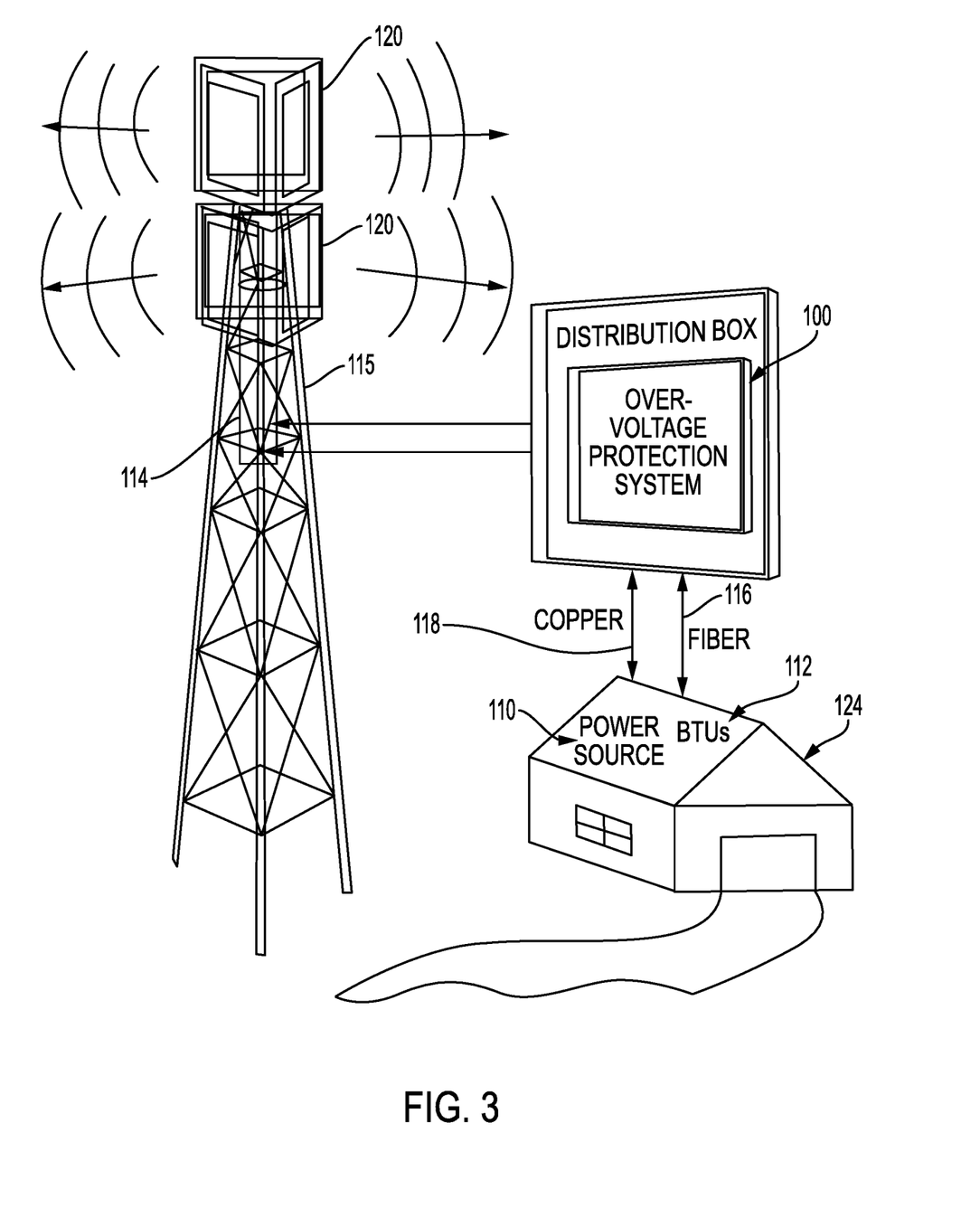
FIG. 3 is a schematic view of a telecommunication system including a base station housing, a power source, a Remote Radio Unit (RRU), a plurality of telecommunications antennas and a redundant over-voltage protection/power distribution system interposing the RRUs/telecommunication antennas and the power source.
Figure 7:
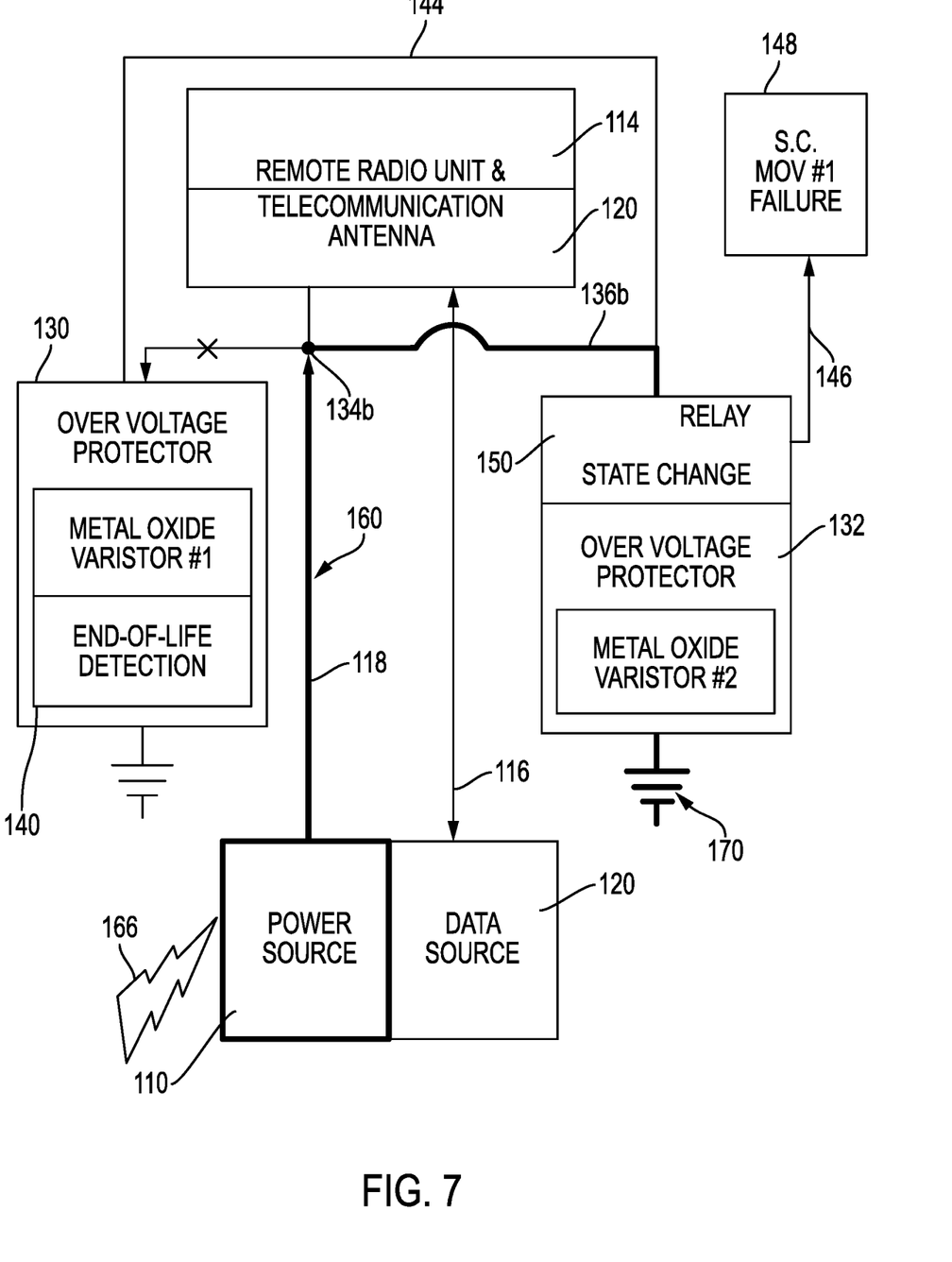
FIG. 7 depicts a schematic of the over-voltage protection/power distribution system wherein a high voltage condition, brought on by a lightning strike, lowers the resistance of the second MOV to re-direct current flow to ground to protect the upstream telecommunications components, i.e., the RRUs and telecommunication antennas.

In FIGS. 3 and 7, a novel redundant, overvoltage protection/power distribution system 100 for a macro antenna telecommunication system (MAS) comprises a power source 110, i.e., AC, DC or PET power sources, for energizing one or more Remote Radio Units 114 (RRUs) mounted atop an elevated structure 115 along with one or more telecommunications antennas 120, e.g., sector antennas. The source of electric power 110 may be physically housed/protected within a Base Station 124 along with one or more Base Transceiver Units 112 (BTUs). The BTUs 112 are operative to exchange RF data to/from each of the RRUs 114/Sector Antennas 120 and a head-end facility (not shown) of one or more cellular/data service providers, e.g., Verizon, Comcast, AT&T etc.

The BTUs 112 communicate with, i.e., send/receive the RF signals to each of the remote units 114 by an optic fiber cable 116. The optic fiber cable 116 is highly efficient and employed to minimize signal losses over large distances, e.g., greater than about eight hundred feet (800') to about one mile. To further improve efficiency, optic signals may be carried or transmitted by multiplexing the optical signal, i.e., Wave Division Multiplexing (WDM), to improve throughput across the fiber optic cable 116. More specifically, WDM may be used to carry multiple frequencies, i.e., the frequencies used by the various service providers/carriers Verizon, Comcast, AT&T etc., along a common fiber optic cable. This technology may also be used to carry the signal across greater distances.

While the fiber optic cable 116 is capable of transmitting RF signals over vast distances, i.e., without the need for amplifiers or repeaters, it is Not capable of transmitting power. Accordingly, the fiber optic cable 116 is accompanied by a conventional metallic copper wire cable 118 along its length. When very low voltage (e.g., DC 56 V) is employed for enhanced safety, a large diameter copper cable, e.g., six (6) to eight (8) gauge wire, is employed to convey power to each of the RRUs 114. When employing an intermediate voltage PET power source, (e.g., DC 345 V), a higher gauge, small diameter, copper wire may be employed, i.e., on the order of between sixteen (16) to twenty (20) gauge wire (Category 5/6 coaxial cable), to convey the power to the remote units 114 and telecommunication antennas 120. While the described embodiment illustrates separate cables, i.e., fiber and copper cables 116, 118, for exchanging data and transmitting power, the optic fiber and wire cables 116, 118 may be bundled in a single hybrid cable (not shown), i.e., contained within a common flexible plastic, or elastomeric, sheath. Inasmuch as the fiber/copper hybrid wire cable may transmit DE/PET power, e.g., DC 345 V, there is no requirement to protect the cables, 116, 118 within an insulating electrical conduit or pipe.

Figure 4:
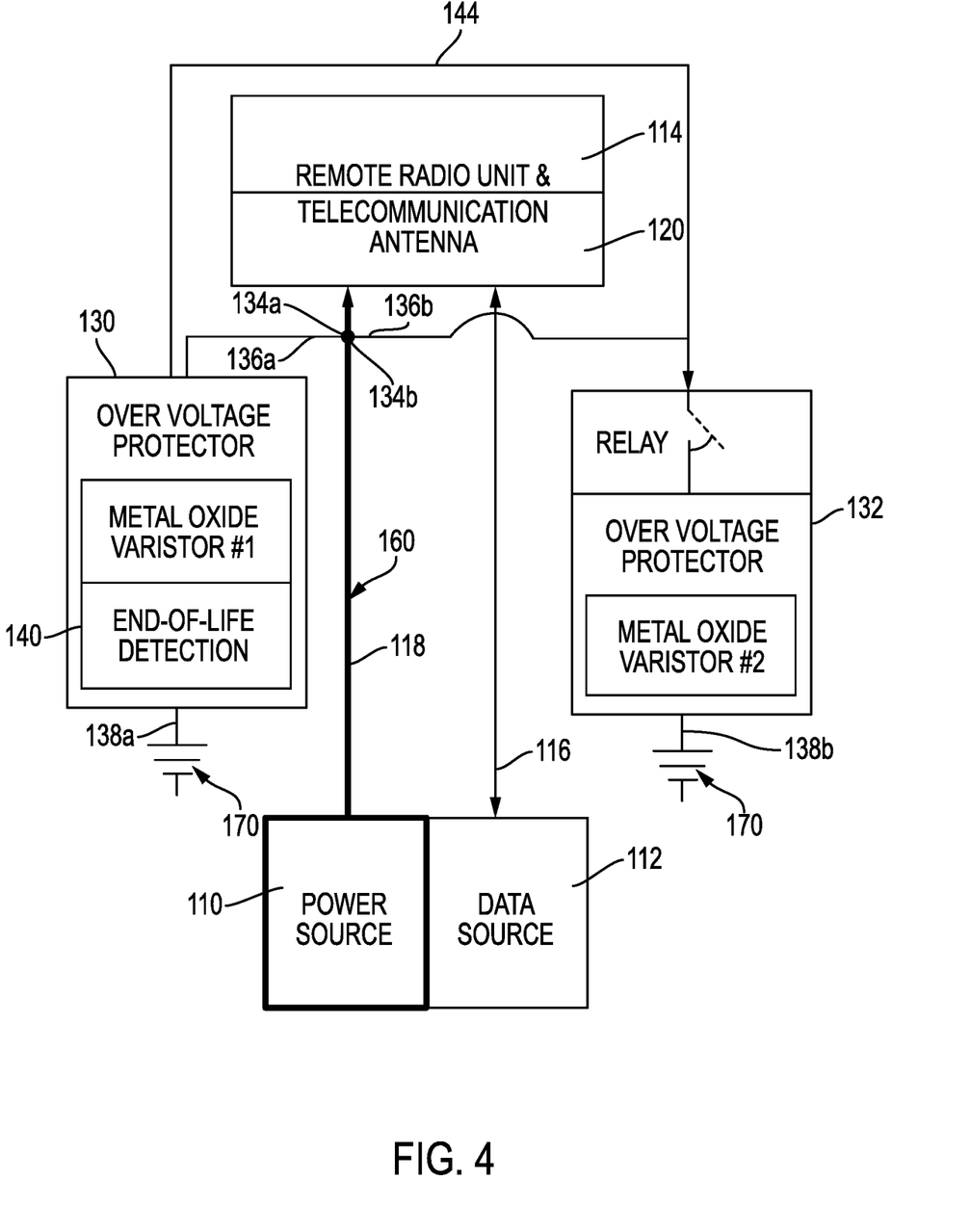
FIG. 4 depicts a schematic of the over-voltage protection/power distribution system including first and second Metal Oxide Varistors (MOV) for directing a flow of current to the respective RRU and telecommunication antenna when the MOV is subject to a normal, low voltage condition.

In FIGS. 3 and 4, the redundant power distribution system 100 comprises first and second overvoltage protection devices 130, 132 each containing a Metal Oxide Varistor (MOV). The terms "overvoltage protection device" "Metal Oxide Varistor" and "MOV" may be used interchangeably herein. The first and second overvoltage protection devices 130, 132 electrically connect to the copper wire cable 118 at nodes 134a and 134b, respectively. The nodes 134a, 134b are each located upstream of the components, e.g., the RRUs 114/telecommunications antennas 120, being protected from an electrical surge/overvoltage. In the described embodiment, the nodes 134a, 134b are coincident, however, they need only be at a location which re-directs the flow of a hazardous electrical current around or away from the path of the electrical components sought to be protected.

The first ends 136a, 136b of the first and second overvoltage protection devices/MOVs 130, 132 electrically connect to the upstream nodes 134a, 134b while the second ends 138a, 138b of the first and second overvoltage protection devices/MOVs 130, 132 electrically connect to ground, or to an infinite electric sink. At least one of the MOVs 130 includes an "end-of-life" circuit 140 operative to detect when the varistor contained within the respective one of the MOVs 130, 132 is no longer operative within acceptable limits. That is, over time, the metal oxide materials, i.e., the zinc, cobalt, nickel etc., will degrade and fail. That is, repeated current spikes cause a disc-shaped varistor used therein to become brittle, crack, and effect an open circuit. This "end-of-life" or failed condition can be sensed by a metal disc which melts within a cavity of the respective MOV housing, i.e., the housing which contains the varistor disc. When an overvoltage condition exists, a high current condition causes the metal to melt, filling a fracture gap in the varistor disc. As a consequence, the meltable metal completes a circuit which issues a signal on lines 144 or 146 (FIGS. 4-7) that the MOV has failed, i.e., permanently. A simple message, cue or code 148 is issued to alert the service provider that one of the overvoltage protection devices/MOVs 130, 132 has failed requiring replacement/repair of the responsible one of the overvoltage protection device/MOVs 130, 32

The other of the first and second MOVs 130, 132 may or may not include "end-of-life" circuit monitoring but is initially in an inoperative state. Accordingly, the first of the overvoltage protection devices/MOVs 130 is initially operative and provides overvoltage protection in a manner consistent with any varistor surge protection device. That is, when exposed to a low voltage, the resistivity is high such that current flows into the desired circuit, or directly into the RRUs 114/telecommunications antennas 120. While the first of the overvoltage protection devices/MOVs 130 is in an operative state, the second of the overvoltage protection devices/MOVs 132 is in an inoperative state.

Figure 6:
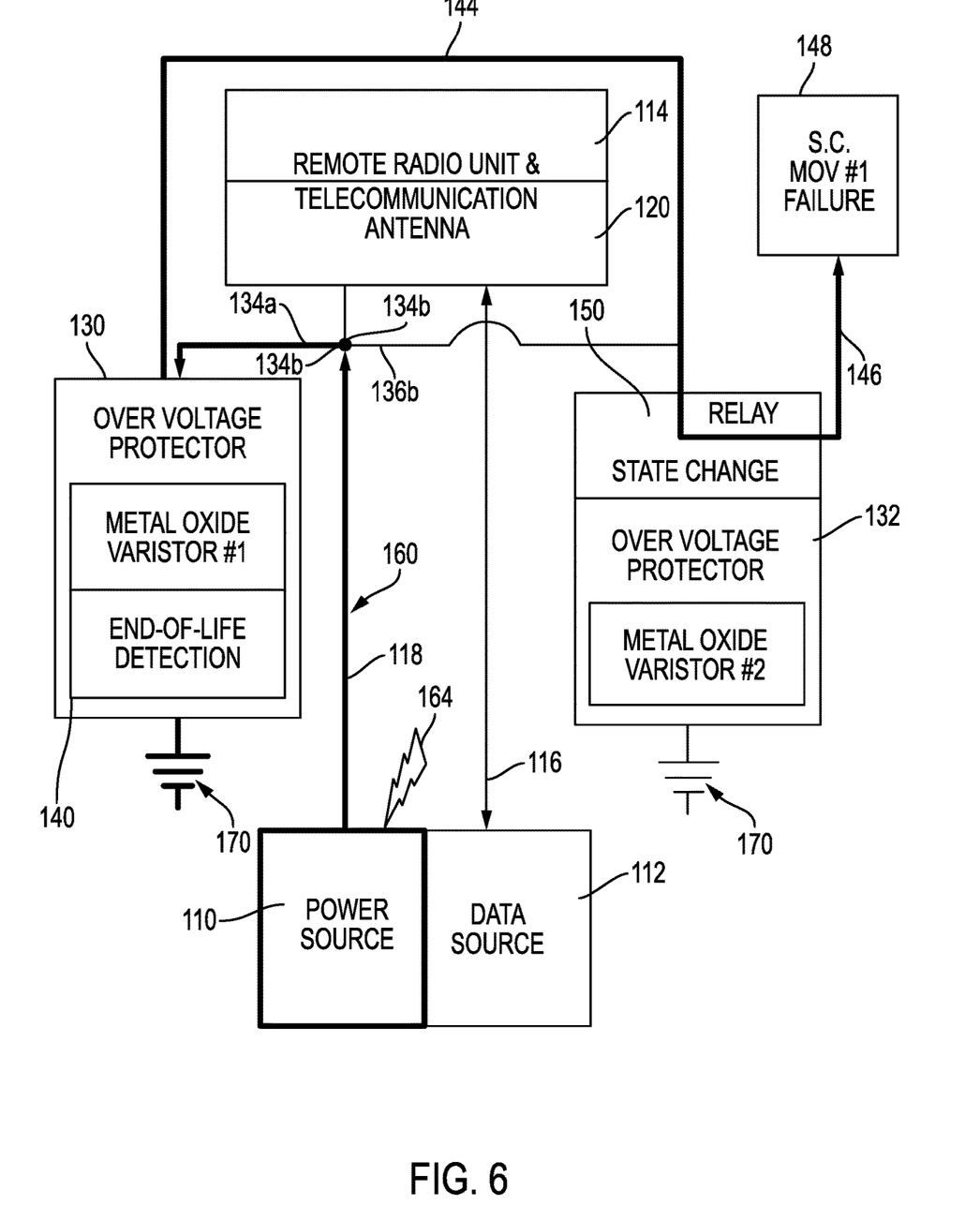
FIG. 6 depicts a schematic of the over-voltage protection/power distribution system wherein an end-of-life detection/monitoring circuit directs a flow of current to a relay configured to change the state of the second MOV from an inoperative state to an operative state.

When the first overvoltage protection device 130 has failed, the meltable metal therein, provides a signal, on line 144, indicative of an "end-of-life" or failed condition. A relay 150 is responsive to the end-of-life signal 144 to change the state of the second overvoltage protection device 132, i.e., from an inoperative to an operative state. Accordingly, overvoltage protection is no longer provided by the first MOV 130, but is now provided by the second MOV 132. In this state, the RRUs 114/telecommunications antennas 120 continue to provide service to cellular customers, without loss of service. Further, inasmuch as a cue has been provided to the service provider with respect to the first MOV 130, a reasonable time period may be implemented to repair or replace the first MOV 130 such that redundant protection can be re-established for protecting the RRU 114/telecommunications antenna 120.

The end-of-life condition may or may not be brought on by a lightning strike. Rather, prolonged use over time may be sufficient to cause the metal oxide varistor to fail. Consequently, if the right conditions are present, the normal low voltage employed in the circuit may be sufficient to cause the metal to melt and provide the requisite alert.

The various operational states/conditions of the redundant power distribution system 100 are depicted in FIGS. 4 through 7. Therein, current flow is highlighted by the weight of the printed lines from the power source 110 to the RRU 114/telecommunications antenna 120. Specifically, in FIG. 4, the redundant power distribution system 100 shows normal operating conditions including power transmitted along line 160 to the RRU 114/telecommunications antenna 120. The first overvoltage protection device/MOV 130 is exposed to relatively low voltage potential and the high resistance in the varistor directs current flow directly into the RRU 114/telecommunications antenna 120.

Figure 5:
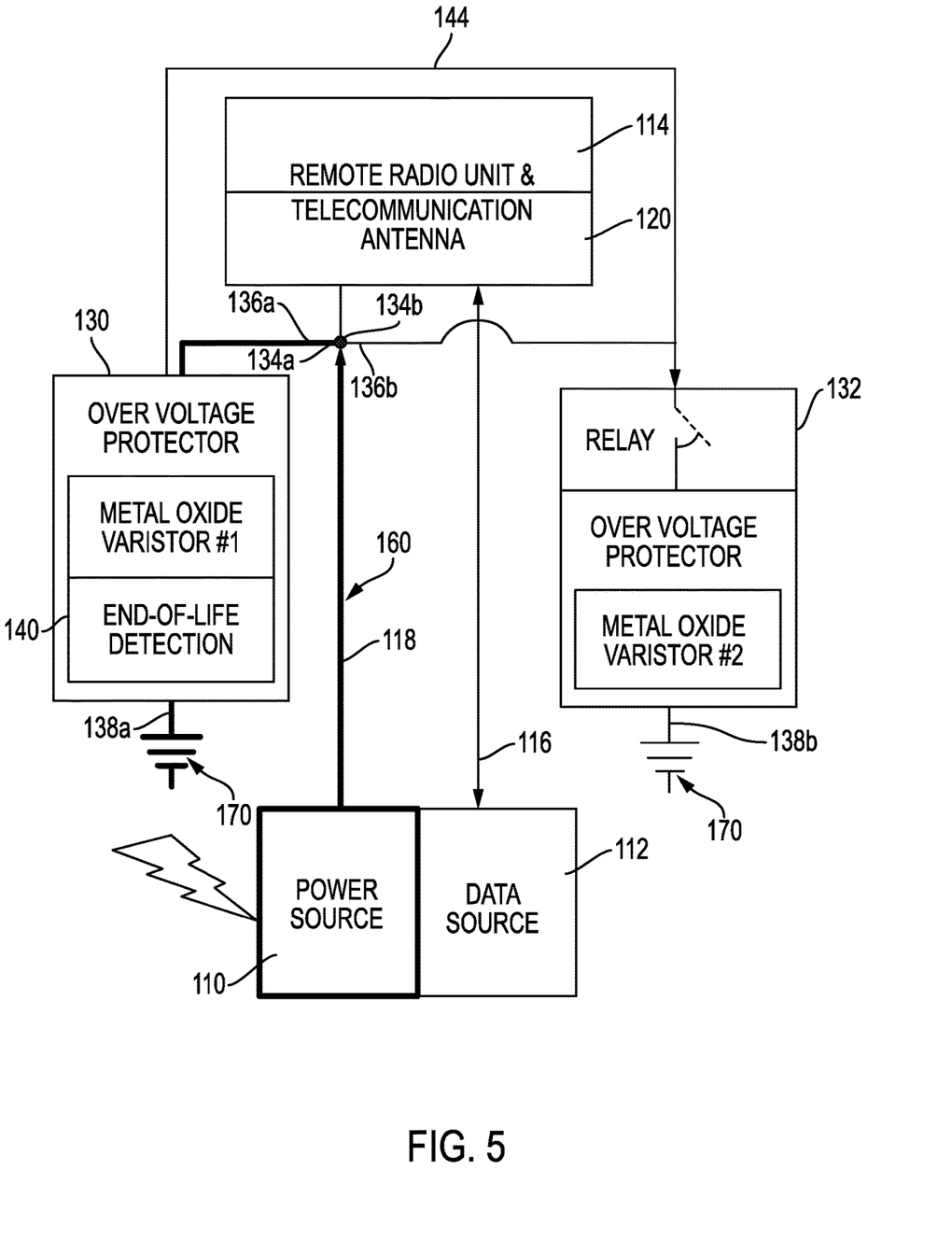
FIG. 5 depicts a schematic of the over-voltage protection/power distribution system wherein a high voltage condition, brought on by a lightning strike, lowers the resistance of the first MOV to re-direct current flow to ground rather than to the upstream telecommunications components, i.e., the RRUs and telecommunication antennas.

In FIG. 5, the first MOV 130 is exposed to a lightning strike 162 which effects an electrical surge/overvoltage condition across the MOV 130. The resistance in the varistor is rapidly reduced to allow current to flow into ground 170. Inasmuch as the first end 136a of the first overprotection device/MOV 130 is connected to the power cable 118 at node 134a, upstream of the RRU 114/telecommunication antenna 120, the current/overvoltage does not flow into the sensitive/costly RRU 114/telecommunication antenna 120. Rather, the high current flows into ground to prevent and/or mitigate damage to the RRU 114/telecommunication antenna 120.

In FIG. 6, a lightning strike 164 or other electrical event, causes the varistor of the first MOV 130 to fail. The meltable metal therein flows, and an "end-of-life" signal to be issued by the monitoring circuit on, 146. The end-of-life signal provides an alert, cue or message 148 to the service provider to repair/replace the first MOV 130. In addition to providing a warning/repair code 148, the relay 150 is energized by, and responds to, the end-of-life signal 144 to change the state of the second MOV 132. More specifically, the end-of-life signal 144 causes the relay 150 to change the state of the second MOV 132 from an inoperative to an operative state. Consequently, the second MOV 132 now provides overvoltage protection for the RRU 114/telecommunication antenna 120. While the first MOV 130 may, due to its failed condition, no longer impact the circuit, the relay may also disconnect or sever the connectivity between the first MOV 130 and the power cable 118.

In FIGS. 4 and 7, the RRU 114/telecommunications antenna 120 continues to operate and is protected from an overvoltage condition by the second MOV 132. FIG. 4 shows the normal operation, wherein the high resistivity of the varistor in the second MOV 132, directs power into the RRU 114/telecommunication antenna 120 for its continued operation. Schematically, either of the surge protection devices 130, 132 may protect the RRUs 114 and telecommunication antennas 120. In FIG. 7, a lightning strike 166 causes the resistance in the second overvoltage protection device 132 MOV to drop. The rapid reduction in varistor resistance directs current to flow to ground 170, protecting the RRU 114/telecommunication antenna 120 from lightning strike damage. One would not use the second MOV 132 in the capacity of the an overvoltage protection device for an extended period of time. And, certainly not until reaching an "end-of-life" condition. Rather, the service provider would, after a reasonable time period, repair the first MOV 130 while resetting the state of the second MOV 132. Thereafter, the second MOV 132 would continue to provide redundant protection for the first, or primary overvoltage protection device 130.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are The following is claimed:

1. In a telecommunication system subject to lightning strikes and having a power cable supplying electrical power to at least one Remote Radio Unit, an overvoltage protection system, comprising:
   first and second surge protection devices each having one end electrically connected to the power cable upstream of the Remote Radio Unit, and a second end electrically connected to ground,
   the first and second surge protection devices each having an operative state and an inoperative state, at least one of the surge protection devices having a monitoring circuit operative to issue an end-of-life signal when the surge protection device has changed state from an operative to an inoperative state; and
   a relay connecting to at least one of the surge protection devices and operative to change its state from an inoperative state to an operative state;
   wherein, in a first operating mode, the first surge protection device is in an operative state and the second surge protection device is in an inoperative state, and,
   wherein, in a second operating mode, the relay changes the state of the second surge protection device from an inoperative state to an operative state in response to an end-of-life signal issued by the first surge protection device;
   wherein, the second surge protection device providing continued operation of the telecommunications system following the change in state of the first surge protection device from an operative to an inoperative state,
   wherein a cue is issued that the first overvoltage protection device has reached an end-of-life condition,
   wherein each surge protection device employs a variable resistivity ohmic component responsive to a low voltage potential and to a high voltage potential, the ohmic component having a high resistivity when exposed to the low voltage potential and a low resistivity when exposed to the high voltage potential, and
   wherein the second surge protection device is configured to be replaced following a prescribed time of use following the issuance of the cue.

2. The overvoltage protection system of claim 1, wherein the relay is configured to disconnect the first surge protection device from the power cable and wherein in the second operating mode the relay enables the second surge protection device in response to the end-of-life signal.

3. The overvoltage protection system of claim 2, wherein each of the surge protection devices are Metal Oxide Varistors (MOVs).

4. The overvoltage protection system of claim 3, wherein at least one of the first and second surge protection devices employs a meltable metal to complete a circuit to initiate the end-of-life signal.

5. A redundant power distribution device for a telecommunication system comprising:
   a first varistor having a variable resistivity ohmic component therein responsive to a low voltage potential and to a high voltage potential, the ohmic component having a high resistivity when exposed to the low voltage potential and a low resistivity when exposed to the high voltage potential; the first varistor connected at one end to an electric node upstream of a circuit to be protected from an overvoltage and at a second end to electrical ground, the first varistor having an end-of-life sensing circuit;
   a second varistor having a variable resistivity ohmic component therein responsive to low and high voltage potentials, the ohmic component having a high resistivity when exposed to the low voltage potential and a low resistivity when exposed to the high voltage potential; the second varistor having one end connected to electrical ground; and
   a relay operative to connect the other end of the second varistor to the electrical node upstream of the circuit to be protected;
   wherein upon sensing an end-of-life condition, a first cue is issued indicative of the end-of-life condition of the first varistor, and wherein the relay is energized to connect the other end of the second varistor to the electrical node upstream of the circuit to be protected, thereby enabling continued operation of the telecommunication system while providing a second cue that redundant protection is no longer available, and
   wherein the second varistor is configured to be replaced following a prescribed time of use following the issuance of the first cue.

6. The redundant power distribution device of claim 5, wherein the first and second metal oxide varistors include a ceramic mass of zinc oxide in a matrix of metal oxides from the group of: bismuth, cobalt, and manganese.

7. A telecommunication system comprising:
   a plurality of remote units connecting a master unit to a plurality of telecommunications antennas, each of the remote units including:
   overvoltage protection devices connected to each of the remote units and operative to protect each remote unit from an overvoltage condition, one of the overvoltage protection devices initially in an operative state and the other in an inoperative state, the overvoltage protection device issuing an alert signal when a voltage monitoring circuit therein detects a failed condition, and
   a relay, responsive to the alert signal, to change the state of the inoperative overvoltage protection device to an operative state,
   wherein a cue is issued that a first overvoltage protection device has failed; and
   wherein a second overvoltage protection device is configured to be replaced following a prescribed time of use following the issuance of the cue.

8. The telecommunication system of claim 7, wherein the change in operating state provides continued overvoltage protection for each of the remote units when one of the overvoltage protection devices becomes inoperative.

9. The telecommunication system of claim 7, wherein the relay disconnects the first overvoltage protection device from a power cable and enables the second overvoltage protection devices.

10. The telecommunication system of claim 7, wherein each of the overprotection devices are Metal Oxide Varistors (MOVs).

11. The telecommunication system of 10 wherein the at least overvoltage protection device employs a meltable metal to initiate a failed condition signal.

12. A telecommunication system having power and data cables for supplying power and data, respectively, to at least one Remote Radio Unit (RRU) from a base transceiver unit (BTU) and a source of power, comprising:

first and second surge protection devices each having one end electrically connected to the power cable upstream of the at least one RRU, and a second end electrically connected to ground, the first and second surge protection devices each having an operative state and an inoperative state, at least one of the surge protection devices having a monitoring circuit operative to issue an end-of-life signal when the surge protection device has changed state from an operative to an inoperative state; and a relay connecting to at least one of the surge protection devices and operative to change its state from an inoperative state to an operative state;

a connector having first and second ends each having a plurality of power pins and fiber optic data connectors, the first end operative to transmit power from the power source and exchange data with the BTU, the second end operative to transmit power and exchange data with the at least one RRU, the first end of the connector keyed with the second end of the connector;

wherein, in a first operating mode, the first surge protection device is in an operative state and the second surge protection device is in an inoperative state and, wherein, in a second operating mode, the relay changes the state of at least one of the protection devices from an inoperative state to an operative state in response to the end-of-life signal, the second surge protection device providing continued surge protection of the telecommunications system following the change in state of the first surge protection device wherein a cue is issued that the first surge protection device has reached an end-of-life condition and wherein the second surge protection device is configured to be serviced following a prescribed time of use following the issuance of the cue.

* * * * *